(12) United States Patent
Singh

(10) Patent No.: US 12,086,576 B2
(45) Date of Patent: Sep. 10, 2024

(54) METHOD FOR MITIGATING MEMORY ACCESS CONFLICTS IN A MULTI-CORE GRAPH COMPILER

(71) Applicant: XILINX, INC., San Jose, CA (US)

(72) Inventor: Abnikant Singh, Bangalore (IN)

(73) Assignee: XILINX, INC., San Jose, CA (US)

( * ) Notice: Subject to any disclaimer, the term of this patent is extended or adjusted under 35 U.S.C. 154(b) by 16 days.

(21) Appl. No.: 17/877,395

(22) Filed: Jul. 29, 2022

(65) Prior Publication Data
US 2024/0036842 A1 Feb. 1, 2024

(51) Int. Cl.
*G06F 9/44* (2018.01)
*G06F 8/41* (2018.01)

(52) U.S. Cl.
CPC ............. *G06F 8/443* (2013.01); *G06F 8/41* (2013.01)

(58) Field of Classification Search
CPC .................... G06F 8/443; G06F 8/41
See application file for complete search history.

(56) References Cited

U.S. PATENT DOCUMENTS

| | | | | |
|---|---|---|---|---|
| 6,823,507 B1 * | 11/2004 | Srinivasan | ............. | G06F 8/443 717/154 |
| 10,275,365 B1 * | 4/2019 | Gonion | ................ | H04L 9/0618 |
| 2003/0093780 A1 * | 5/2003 | Freudenberger | ........ | G06F 8/443 717/153 |
| 2007/0169059 A1 * | 7/2007 | Halambi | ............... | G06F 8/4452 717/160 |
| 2010/0306746 A1 * | 12/2010 | Barua | ....................... | G06F 8/52 717/136 |
| 2011/0138373 A1 * | 6/2011 | Lane | ....................... | G06F 8/443 717/157 |
| 2013/0227521 A1 * | 8/2013 | Bourd | ................. | G06F 11/3652 717/110 |

* cited by examiner

*Primary Examiner* — Hang Pan
(74) *Attorney, Agent, or Firm* — Patterson + Sheridan, LLP

(57) ABSTRACT

A multi-core architecture in some examples may have hundreds of "cores", each core comprising a digital signal processor (DSP) and various functional computing units. A method of implementing a multi-core graph compiler for a system-on-chip (SOC) having a data processing engine (DPE) array is disclosed herein. An Adaptive Intelligence Engine (AIE) compiler is one example of a multi-core graph compiler. An compiler is used to mitigate performance degradation due to memory stalls (collisions) when executing an AIE compiler-accelerated application on an AI Engine. The method disclosed here addresses phase order issues to mitigate the memory collisions.

20 Claims, 17 Drawing Sheets

| Benchmarks | Dynamic Cycles - Original | Dynamic Cycles - With Proposed Optimization | % Gain in Number of Cycles |
|---|---|---|---|
| fft_12_batch | 1364 | 990 | 38 |
| fir_63t_sym | 643 | 586 | 10 |
| fir_24t_cmplx_strm | 897 | 806 | 12 |
| dir_conv_int8_l1 | 4580 | 3852 | 19 |

```
      688         LDA  cl0, [p0] , #4;   LDB r0, NOP       ADD r2, r0, r1;   MOV r1, cl0;
ZLS_F_Z4testPiS__112
      704    1    LDA  cl0, [p0] , #4;   LDB r0, [p1], #4; ST r2, [p2], #4; ADD r2, r0, r1; MOV r1, cl0;
      720         NOP;                   LDB r0, [p1], #4; ST r2, [p2], #4; ADD r2, r0, r1; MOV r1, cl0
      732                                                  ST r2, [p2], #4; ADD r2, r0, r1; MOV r1, cl0
```

1608

```
15  __AIE_NOINLINE__  void test(int *a, int *b)
16  {
17      int * restrict p = d;
18      for (int i = 0; i < 50; ++i)
19      {
20          unsigned int chess_storage(cl0) n = a[i];
21          *p++ = n + b[i];
22      }
23  }
24  int main ()
25  {
26      int                                 *c1 = c;
27      int                                 *c2 = c + 50;
28      int __aie_dm_resource_a *c1A = (int __aie_dm_resource_a *)c1;
29      int __aie_dm_resource_a *c2A = (int __aie_dm_resource_a *)c2;
30      test_bankA(c1A,c2A);    // (sequential loads - expected ) -> 2-cycle loop
31      test(c1,c2);            // (parallel loads  - expected ) -> 1-cycle loop
32      return 0;
33  }
```

FIG. 16

METHOD FOR MITIGATING MEMORY ACCESS CONFLICTS IN A MULTI-CORE GRAPH COMPILER

TECHNICAL FIELD

Examples of the present disclosure generally relate to compilers, and in particular, to a novel control-flow for a multi-core graph compiler.

BACKGROUND

Memory conflicts in a multi-core graph compiler may result in performance degradation due to memory stalls that occur when executing an Adaptive Intelligence Engine (AIE) compiler-accelerated application. An AIE compiler is one example of a multi-core graph compiler. Control-flow graphs represent all paths that might be traversed through a program during its execution. A kernel with optimal static loop count may have sub-optimal dynamic cycle count. These memory conflicts at runtime can adversely affect the execution cycle count.

Thus, there is a need for an improved method for mitigating memory conflicts.

SUMMARY

Disclosed here is a method for mapping a program to a data processing engine (DPE) array comprising many "cores" (compute units). An application is compiled to generate intermediate representation code. Memory access analysis is performed on the intermediate representation code. The intermediate representation code is then modified, based on the results of the memory access analysis, so as to mitigate memory access conflicts between DPEs in the array.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 15 depicts Results after performing an Optimization Flow.

FIG. 16 depicts Pointers pointing to the same buffer.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
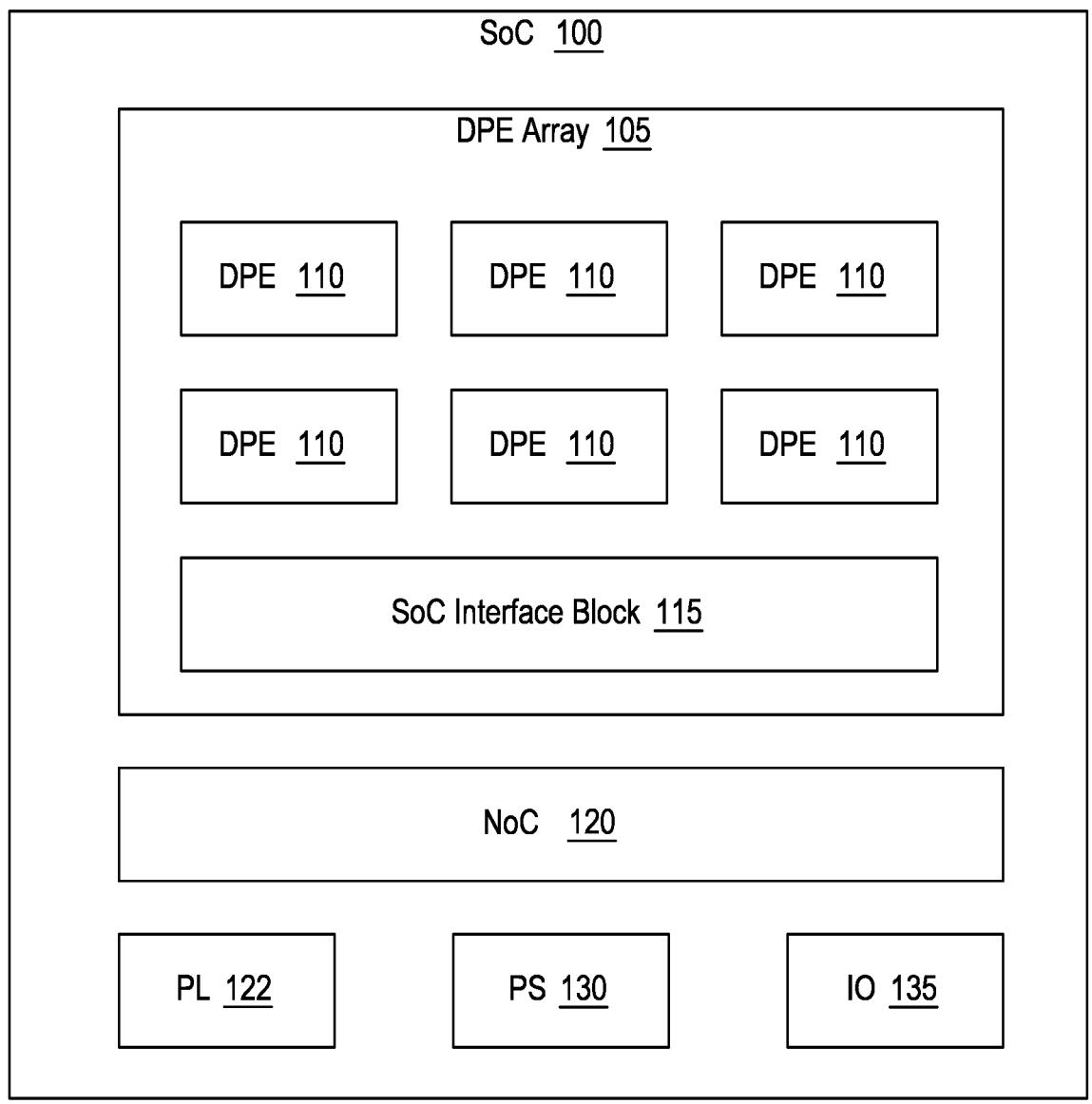
FIG. 1 is a block diagram of a System-on-Chip (SoC) according to an example.

These and other examples may be understood with reference to the following detailed description.

A graph compiler receives a graph of nodes and connections, then each of the nodes is compiled with a separate compiler. In some examples, the nodes represent kernels of the application. An Adaptive Intelligence Engine (AIE) compiler is one example of a multi-core graph compiler. The disclosure here presents a novel AIE compiler method to mitigate performance degradation due to memory stalls (collisions) when executing an AIE compiler-accelerated application on an AI Engine. As a result of memory stalls, the number of cycles needed to produce data will increase, but the data is not corrupted. However, when many memory stalls occur, the system performance will decrease. The method disclosed here addresses phase order issues to mitigate the memory collisions.

A multi-core graph compiler in some examples may have hundreds of "cores", each core comprising a digital signal processor (DSP) that may support Very Long Instruction Words (VLIW). In some examples, a core contains functional units such as scalar computing units, floating point computing units, or vector computation units. A core in some examples may support Instruction Level Parallelism (ILP).

An AIE compiler is one example of a multi-core graph compiler. This disclosure presents a novel AIE compiler to address the performance degradation due to memory stalls (collisions) when executing an AIE compiler-accelerated application on an AIE. This disclosure addresses the phase order issue to address the memory collisions.

In some examples, an AIE is architected as a 2D array consisting of multiple AIE tiles that allow for a very scalable solution, ranging from 10 s to 100 s of AIE's in a single device, servicing the computing needs of a breadth of applications.

In some examples, each AIE tile comprises a VLIW, Single Instruction Multiple Data (SIMD) vector processor optimized for machine learning and advanced signal processing applications. An AIE processor can run up to 1.3 GHz, enabling very efficient, high throughput and low latency functions.

As well as the VLIW Vector processor, each tile contains program memory to store the necessary instructions; local data memory for storing data, weights, activations and coefficients; a RISC scalar processor and different modes of interconnect to handle different types of data communication.

Suboptimal Quality of Results (QoR) effects may be due to memory conflicts in an AIE. Performance degradation due to memory stalls may be observed when executing an AIE compiler-accelerated application. A kernel with optimal static loop count may have sub-optimal dynamic cycle count. Memory conflicts at runtime can adversely affect the execution cycle count.

The disclosure herein presents a novel graph compiler compilation flow to address the performance degradation due to memory stalls when executing a graph compiler-accelerated application on an AIE.

In some examples, the compilation flow may be implemented on an integrated circuit or a computer system on a chip.

The method disclosed herein solves two problems:
1. How to map the buffers in a graph compiler-accelerated application to avoid memory collisions.
2. Preventing performance stall when two memory slots are accessed at the same time.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Techniques described herein provide a process for taking a graph-based programmatic description of an application for a multi-core architecture of a system-on-chip (SOC) and compiling the application to the multi-core architecture to produce execution binaries for each core and configuration code for programmable components. The compilation operations include transforming the input graph description to an internal representation, performing code analysis and optimization, identifying which computation kernels should be grouped together (e.g., clustering), mapping these groups to specific data processing engines (e.g., cores) and the data structures used by the kernels to local memory. The compilation operations further include routing stream and direct memory access (DMA) data between data processing engines and to and from programmable logic via stream switches. The compilation operations further include generating wrapper code to orchestrate the execution of each data processing engine, generating the configuration code for the DMAs and stream switches, and generating a program for execution by a processing system to control the application. These and further aspects are discussed below with respect to the drawings.

FIG. 1 is a block diagram of a device 100 that includes a data processing engine (DPE) array 105, according to an example. In examples, device 100 is a System-on-Chip (SoC) type of device. In general, a SoC refers to an IC that includes two or more subsystems capable of interacting with one another. As an example, a SoC may include a processor that executes program code and one or more other circuits. The other circuits may be implemented as hardwired circuitry, programmable circuitry, other subsystems, and/or any combination thereof. The circuits may operate cooperatively with one another and/or with the processor. The DPE array 105 includes a plurality of data processing engines (DPEs) 110 that may be arranged in a grid, cluster, or checkerboard pattern in the device 100. Although FIG. 1 illustrates arranging the DPEs 110 in a 2D array with rows and columns, the examples are not limited to this arrangement. Further, the array 105 can be any size and have any number of rows and columns formed by the DPEs 110.

In one embodiment, the DPEs 110 are identical. That is, each of the DPEs 110 (also referred to as tiles or blocks) may have the same hardware components or circuitry. Further, the examples herein are not limited to DPEs 110. Instead, the device 100 can include an array of any kind of processing elements or data processing engines. Moreover, the DPEs 110 could be cryptographic engines or other specialized hardware for performing one or more specialized tasks. As such, the DPEs 110 can be referred to generally as data processing engines.

In FIG. 1, the array 105 includes DPEs 110 that are all the same type (e.g., a homogeneous array). However, in another embodiment, the array 105 may include different types of engines. For example, the array 105 may include DPEs 110, cryptographic engines, forward error correction (FEC) engines, and the like. Regardless if the array 105 is homogenous or heterogeneous, the DPEs 110 can include connections to memory modules in neighboring DPEs 110 which permit the DPEs 110 to share the memory modules as described in more detail below.

In one embodiment, the DPEs 110 are formed from non-programmable logic—i.e., are hardened. One advantage of doing so is that the DPEs 110 may take up less space in the device 100 relative to using programmable logic to form the hardware elements in the DPEs 110. That is, using hardened or non-programmable logic circuitry to form the hardware elements in the DPEs 110 such as program memories, an instruction fetch/decode unit, fixed-point vector units, floating-point vector units, arithmetic logic units (ALUs), multiply accumulators (MAC), and the like can significantly reduce the footprint of the array 105 in the device 100. Although the DPEs 110 may be hardened, this does not mean the DPEs 110 are not programmable. That is, the DPEs 110 can be configured when the device 100 is powered on or rebooted to perform different functions or tasks.

The DPE array 105 also includes a SoC interface block 115 that serves as a communication interface between the DPEs 110 and other hardware components in the device 100. In this example, the device 100 includes a network on chip (NoC) 120 that is communicatively coupled to the SoC interface block 115. Although not shown, the NoC 120 may extend throughout the device 100 to permit the various components in the device 100 to communicate with each other. For example, in a physical implementation, the DPE array 105 may be disposed in an upper right portion of the integrated circuit forming the device 100. However, using the NoC 120, the array 105 can nonetheless communicate with various subsystems, for example, programmable logic (PL) 120, a processor subsystem (PS) 130 or input/output (I/O) 135 which may disposed at different locations throughout the device 100.

In addition to providing an interface between the DPEs 110 and the NoC 120, the SoC interface block 115 may also provide a connection directly to a communication fabric in the PL 122. In one embodiment, the SoC interface block 115 includes separate hardware components for communicatively coupling the DPEs 110 to the NoC 120 and to the PL 122 that is disposed near the array 105 in the device 100.

Although FIG. 1 illustrates one block of PL 122, the device 100 may include multiple blocks of PL 122 (also referred to as configuration logic blocks) that can be disposed at different locations in the device 100. For example, the device 100 may include hardware elements that form a field programmable gate array (FPGA). However, in other embodiments, the device 100 may not include any PL 122—e.g., the device 100 is an ASIC.

Figure 2:
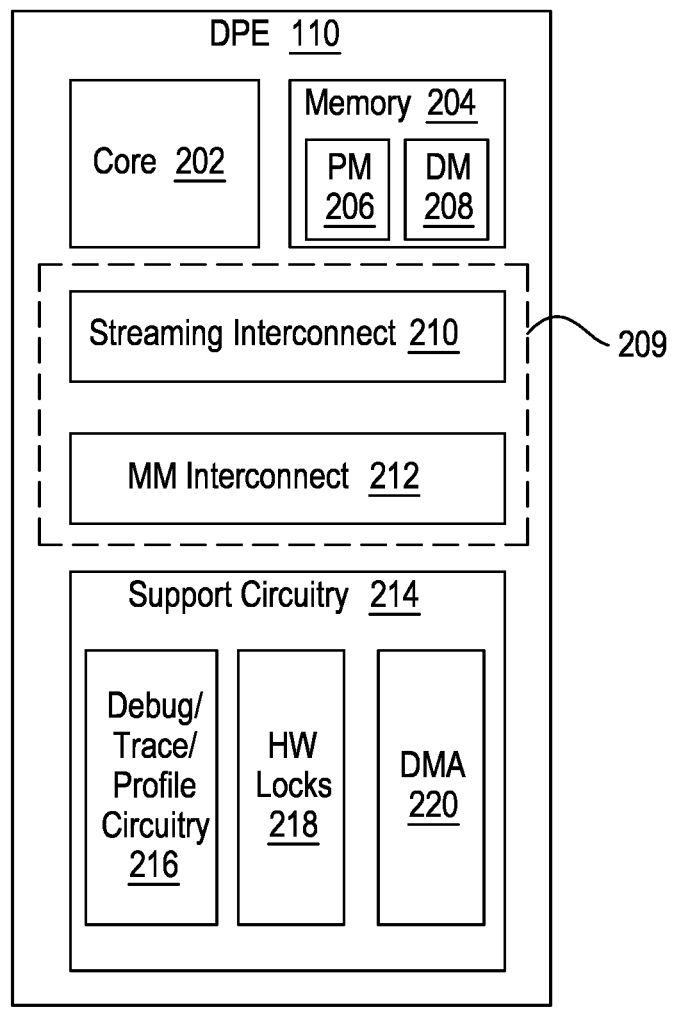
FIG. 2 is a block diagram depicting a tile circuit according to an example.

FIG. 2 is a block diagram depicting a DPE 110 according to an example. The DPE 110 can be used to implement a DPE in a DPE array as discussed above and shown in FIG. 1. The DPE 110 includes a core 202, memory 204, DPE interconnect 209, and support circuitry 214. The DPE interconnect 209 includes streaming interconnect 210 and memory-mapped (MM) interconnect 212. In an example, the support circuitry 214 includes debug/trace/profile circuitry 216, hardware (HW) synchronization circuitry ("HW locks 218"), and direct memory access (DMA) circuitry ("DMA 220"). The memory 204 includes program memory ("PM 206") and data memory ("DM 208").

The core 202 includes one or more compute units for processing data according to instruction(s) stored in the PM 206. In an example, the core 202 includes a very-long instruction word (VLIW) processor, a single instruction, multiple data (SIMD) or vector processor, or a VLIW SIMD/vector processor. In an example, the PM 206 is private to the core 202 (e.g., the PM 206 stores instruction(s) only for use by the core 202 in the DPE 200). In an example, the PM 206 comprises a single-ported random access memory (RAM). The PM 206 can be coupled to the MM interconnect 212 for configuration and loading of instructions. In an example, the PM 206 supports parity, error-correcting code (ECC) protection and reporting, or both parity and ECC. For example, the PM 206 can support 9-bit ECC and be able to correct a 1-bit error or 2-bit errors in a program instruction (e.g., 128 bits).

The core 202 can be directly coupled to the streaming interconnect 210 to receive input stream(s) and/or provide output stream(s). In addition, the core 202 can read and write data to the DM 208 in the DPE 200. As discussed further below, the core 202 in the DPE 200 can also access the DM in one or more neighboring tile circuits (e.g., north, south, east, and west neighboring tile circuits). In an example, as discussed further below, the core 202 can also include a direct connection with the data processing engine in one or more neighboring tiles for forwarding accumulator output (e.g., input and output cascading connection(s)). In an example, the core 202 sees the DM 208 in the DPE 200 and other DM(s) in neighboring tile(s) as one contiguous block of memory. The core 202 can also include an interface to the HW locks 218 and an interface to the debug/trace/profile circuitry 216. The debug/trace/profile circuitry 216 can include trace, debug, and/or profile circuitry.

The MM interconnect 212 can be an Advanced eXtensible Interconnect (AXI) memory-mapped interconnect or the like configured for transmission of data using address transactions between components. In an example, the MM interconnect 212 is used for configuration, control, and debugging functionality for the DPE 200. The MM interconnect 212 includes one or more switches that route transactions based on address. Circuitry can use the MM interconnect 212 to access the memory 204, the core 202, the DMA 220, and configuration registers in the DPE 200.

The streaming interconnect 210 can be an Advanced eXtensible Interconnect (AXI) streaming interconnect or the like configured for transmission of streaming data between components. The streaming interconnect 210 is used for transferring data between the DPE 200 and external circuits. The streaming interconnect 210 can support both circuit switching and packet switching mechanisms for both data and control.

In an example, as described further below, the DM 208 can include one or more memory banks (e.g., random access memory (RAM) banks). The DMA 220 is coupled between the streaming interconnect 210 and the DM 208. The DMA 220 is configured to move data from the streaming interconnect 210 to the DM 208 and move data from the DM 208 to the streaming interconnect 210. In this manner, an external circuit (e.g., a circuit configured in programmable logic or a circuit in an embedded processing system of the IC) can read data from and write data to the DM 208 through the streaming interconnect 210 using DMA. The DMA 220 can be controlled through the MM interconnect 212 and/or the streaming interconnect 210. In an example, the DM 208 supports parity, error-correcting code (ECC) protection and reporting, or both parity and ECC. For example, the DM 208 can support 9-bit ECC (e.g., 128-bits data).

The HW locks 218 could be used to lock particular memory banks of the DM 208 for access by the core 202, another data processing engine in another tile, or the DMA 220. The HW locks 218 provide synchronization between neighboring data processing engines in neighboring tiles, between the core 202 and the DMA 220, and between the core 202 and an external circuit (e.g., an external processor). The HW locks 218 can also be used to lock a particular buffer in the DM 208, which may be stored in one or more memory banks or in a portion of a single memory bank. The debug/trace/profile circuitry 216 is configured to provide debug, trace, and profile functions. The debug/trace/profile circuitry 216 can trace events generated by circuits in the DPE 200. The debug/trace/profile circuitry 216 can provide profile functionality, for example, configurable performance counters.

Figure 3:
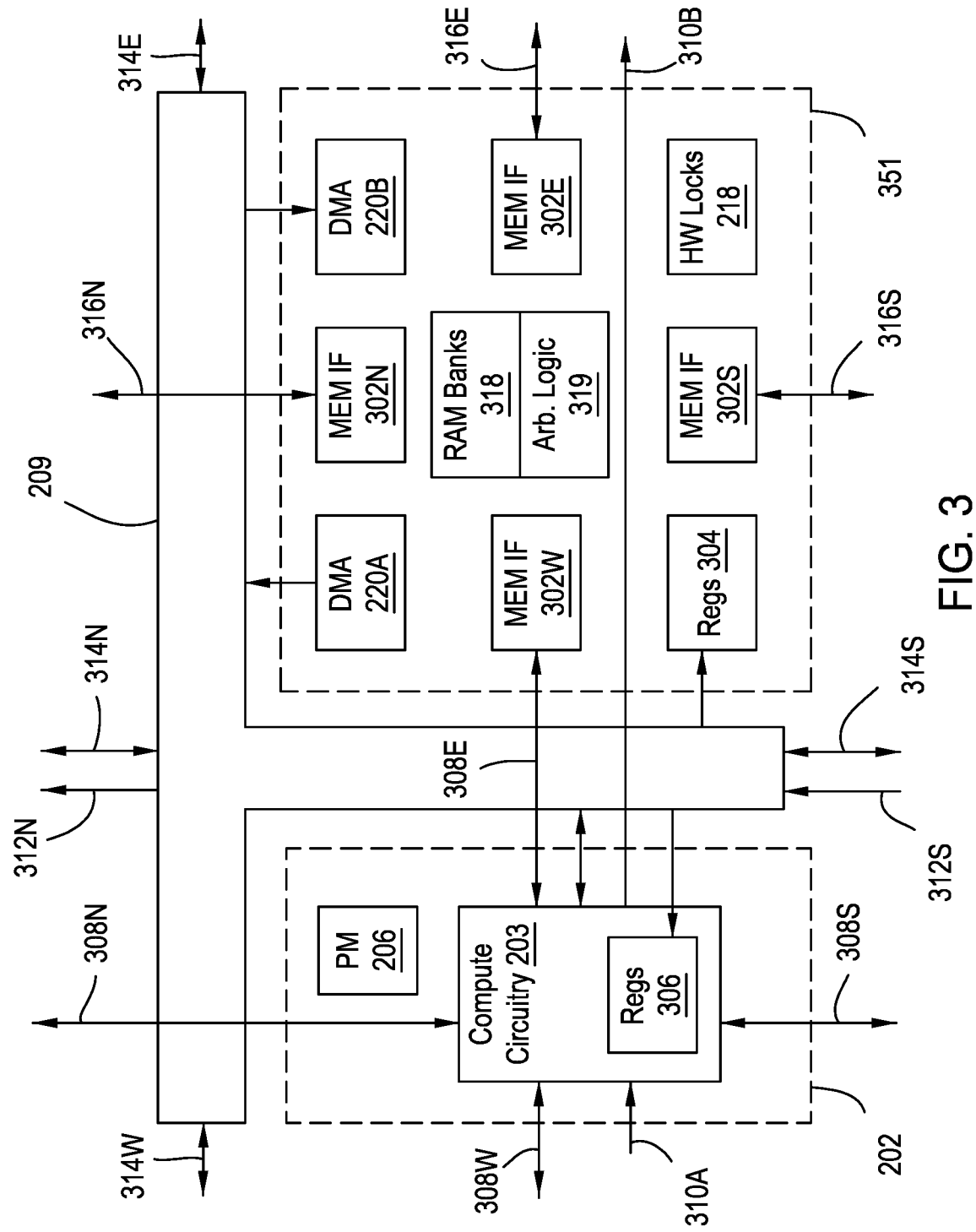
FIG. 3 is a block diagram depicting the tile circuit of FIG. 2 in more detail according to an example.

FIG. 3 is a block diagram depicting the DPE 200 in more detail according to an example. In the example, the DPE 200 includes core 202, a memory module 351, and DPE interconnect 209. The core 202 includes the compute circuitry 203 and the PM 206. The memory module 351 includes memory interfaces 302N, 302S, 302E, and 302W (collectively memory interfaces or individually "mem IF"), RAM banks 318, the HW locks 218, registers ("regs 304"), a DMA interface 204A, and a DMA interface 220B. The compute circuitry 203 includes registers ("regs 306"). The DPE interconnect 209 includes the MM interconnect 212 and the streaming interconnect 210 (shown in FIG. 2). Both the MM interconnect 212 and the streaming interconnect 210 can access the RAM banks 318. The RAM banks 318 include arbitration logic 319 per bank. The arbitration logic 319 is configured to control which interface (N, S, E, W, DMA, external PS, etc.) has access to which bank. Further details of the DPE interconnect 209 are discussed below with respect to the example of FIG. 4.

The DPE interconnect 209 includes a streaming connection 314W to a west tile, a streaming connection 314E to an east tile, a streaming connection 314N to a north tile, and a streaming connection 314S to a south tile. Each streaming connection 314 includes one or more independent streaming interfaces (e.g., busses), each having a specific bit width. The DPE interconnect 209 also includes a memory-mapped connection 312S from a south tile and a memory-mapped connection 312N to a north tile. Although only north and south MM connections are shown, it is to be understood that the DPE interconnect 209 can include other configurations for the MM interconnect (e.g., east-to-west, west-to-east, north-to-south, and the like). It is to be understood that the DPE interconnect 209 can include other arrangements of streaming and memory-mapped connections than shown in the example of FIG. 3. In general, the DPE interconnect 209 includes at least one streaming connection 314 and at least one memory-mapped connection 312.

The compute circuitry 203 includes a connection 308W to memory circuitry in a west tile, a connection 308S to memory circuitry in a south tile, a connection 308N to memory circuitry in a north tile, and a connection 308E to the memory module 351. The compute circuitry 203 include a streaming interface to the DPE interconnect 209. The compute circuitry 203 also includes a connection 310A from a core in the west tile and a connection 310B to a core in the east tile (e.g., cascading connections). It is to be understood that the DPE can include other arrangements of memory and cascading connections than shown in the example of FIG. 3. In general, the compute circuitry 203 includes at least one memory connection and can include at least one cascading connection.

The mem IF 302W is coupled to the memory connection 308E of the compute circuitry 203. The mem IF 302N is coupled to a memory connection of the data processing engine in the north tile. The mem IF 302E is coupled to a memory connection of the data processing engine in the east tile. The mem IF 302S is coupled to a memory connection of the data processing engine in the south tile. The mem IF 302W, 302N, 302E, and 302S are coupled to the RAM banks 318. The DMA 220A includes an output coupled to the DPE interconnect 209 for handling memory to interconnect streams. The DMA 220B includes an input coupled to the DPE interconnect 209 for handling interconnect to memory streams. The regs 304 and the regs 306 are coupled to the DPE interconnect 209 to receive configuration data therefrom (e.g., using the memory-mapped interconnect).

Figure 4:
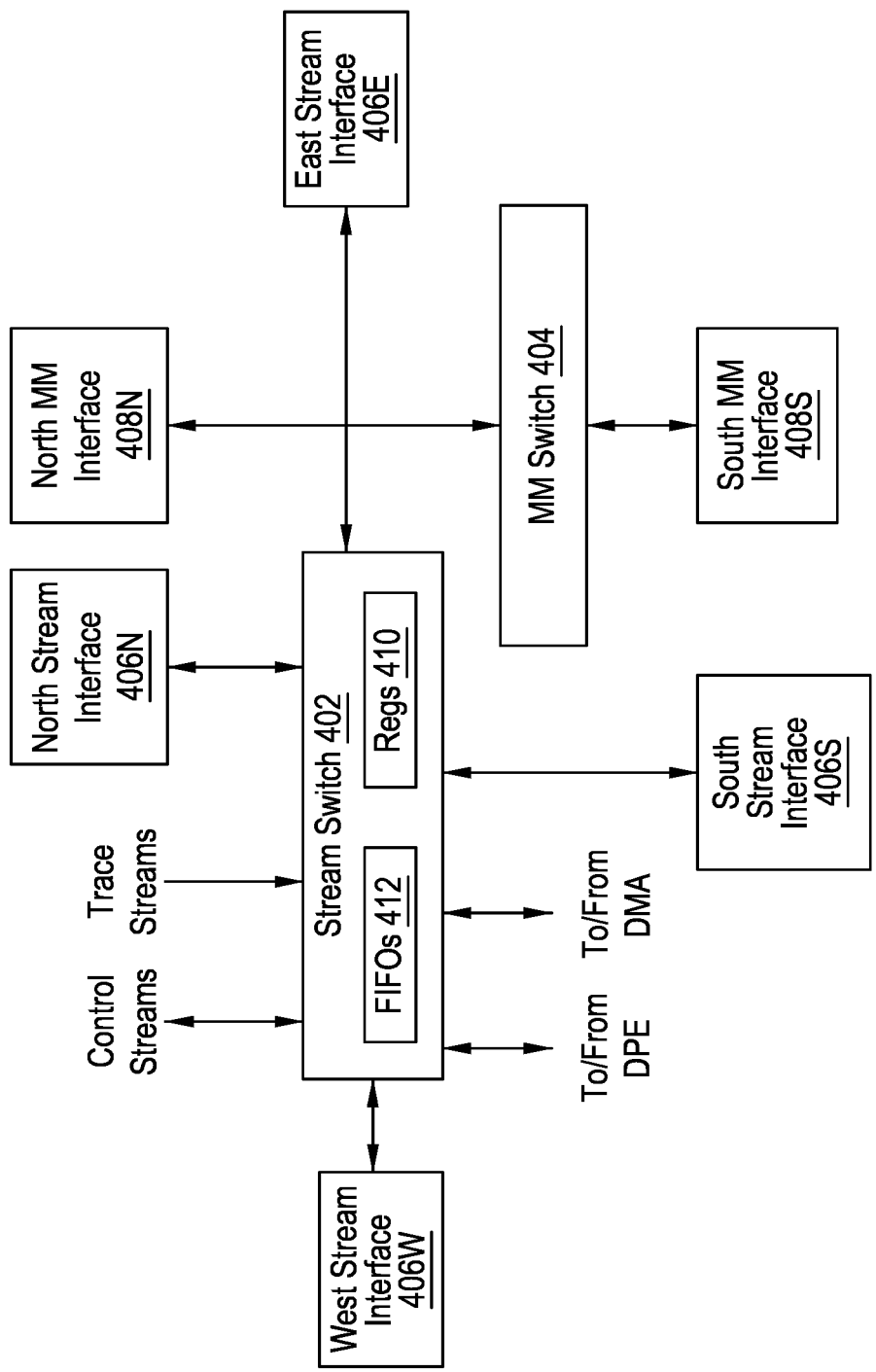
FIG. 4 is a block diagram depicting tile interconnect circuitry according to an example.

FIG. 4 is a block diagram depicting the DPE interconnect 209 according to an example. The DPE interconnect 209 includes a stream switch 402 and an MM switch 404. The stream switch 402 is coupled to a west stream interface 406W, a north stream interface 406N, an east stream interface 406E, and a south stream interface 406S. The west stream interface 406W receives and provides streams to the DPE interconnect of a west tile. The north stream interface 406N receives and provides streams to the DPE interconnect of a north tile. The west stream interface 406W receives and provides streams to the DPE interconnect of a west tile. The south stream interface 406S receives and provides streams to the DPE interconnect of a south tile. The MM switch 404 is coupled to a north MM interface 408N and a south MM interface 408S. The north MM interface 408N is coupled to the DPE interconnect in the north tile. The south MM interface 408S is coupled to the DPE interconnect in the south tile.

The stream switch 402 includes first-in-first-out (FIFO) circuits (FIFOs 412) and registers (regs 410). The FIFOs 412 are configured to buffer streams passing through the stream switch 402. The regs 410 store configuration data for the stream switch 402 that controls the routing of streams through the stream switch. The regs 410 can receive configuration data from the MM switch 404. The stream switch 402 can include an additional interface to the compute circuitry 203 and an additional interface to the DMA circuitry 220. The stream switch 402 can send and receive control streams and receive trace streams (e.g., from the debug/trace/profile circuitry 216).

Figure 5:
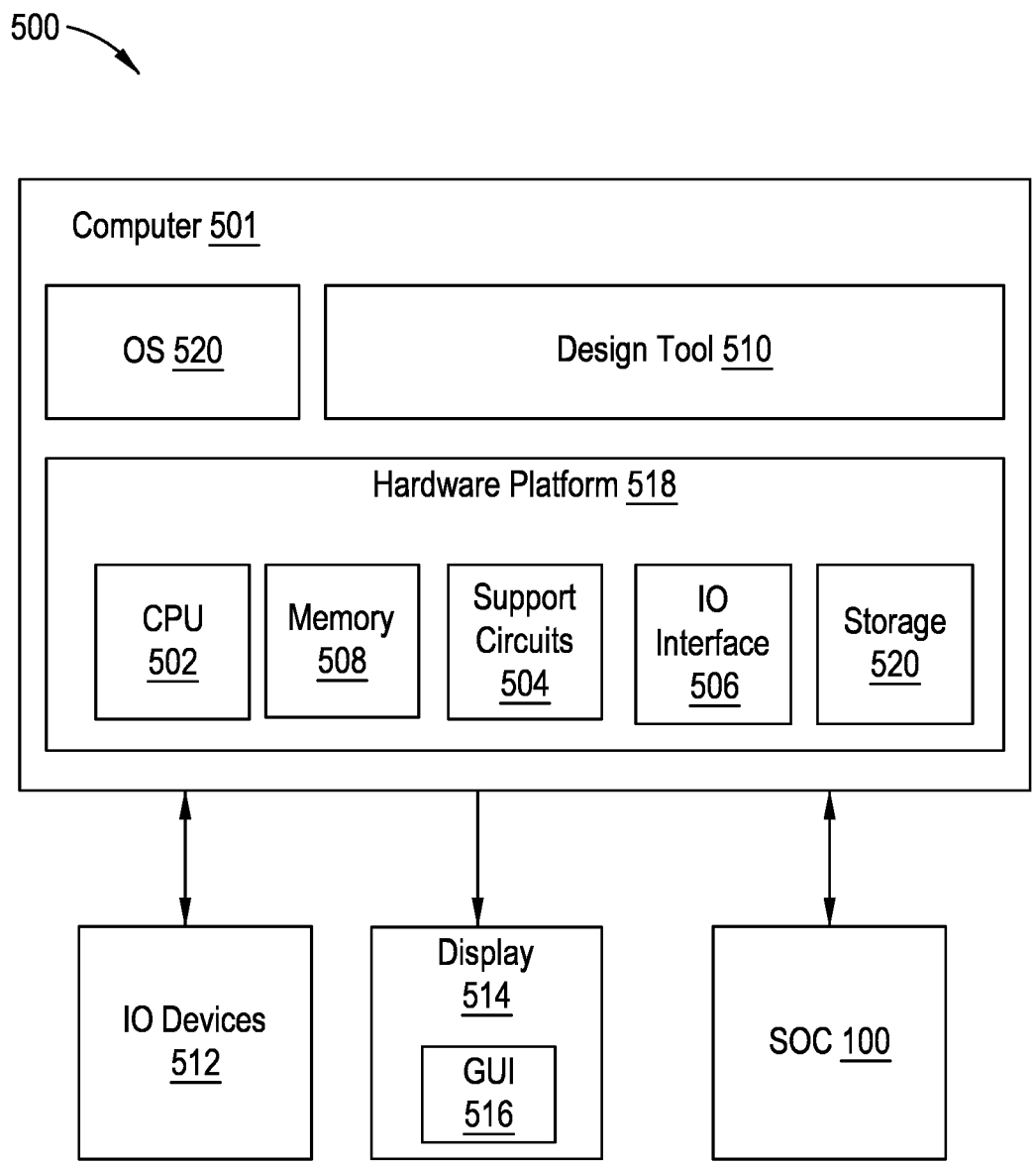
FIG. 5 is a block diagram depicting an example of a circuit design system according to an example.

FIG. 5 is a block diagram depicting an example of a circuit design system 500 according to an example. The circuit design system 500 includes a computer 501 coupled to input/output (IO) devices 512, a display 514, and an SOC 100. The computer 501 includes a hardware platform 518 can include conventional components of a computing device, such as a central processing unit (CPU) 502, system memory 508, various support circuits 504, storage 520, and an IO interface 506. The CPU 502 can include one or more microprocessors. The CPU 502 is configured to execute instructions that perform one or more operations described herein. The instructions can be stored in system memory 508, storage 520, or any other memory in the hardware platform 518 (e.g., cache memory). The system memory 508 includes devices that store information and can include, for example, random access memory (RAM), read-only memory (ROM), or a combination thereof. The storage 520 includes local storage devices, such as hard disks, flash memory modules, solid state disks, optical disks, and the like. The storage 520 can also include interface(s) configured for communication with one or more network data storage systems. The support circuits 504 can include conventional cache, power supplies, clock circuits, data registers, IO interfaces, and the like. The IO interface 506 includes conventional interfaces to the computer 501 known in the art. The IO interface 506 can be coupled to the IO devices 512, which can include conventional keyboard, mouse, and the like. The IO interface 506 can also be coupled to the display 514, which can present a GUI 516 to a user.

The computer 501 further includes a software platform comprising an operating system (OS) 522 and a graph compiler 510. The OS 522 and the graph compiler 510 include instructions that are executed by the CPU 502. The OS 522 can include any known operating system, such as Linux®, Microsoft Windows®, Mac OS®, and the like. The graph compiler 510 is an application that executes within the OS 522, which provides an interface to the hardware platform 518. Operation of the graph compiler 510 is discussed below. An example design tool that can be adapted to include the techniques described herein is the VIVADO® Design Suite available from Xilinx, Inc. of San Jose, California, although other circuit design tools can be similarly adapted.

Compiler Flow for a Heterogeneous Multi-Core Architecture

Figure 6:
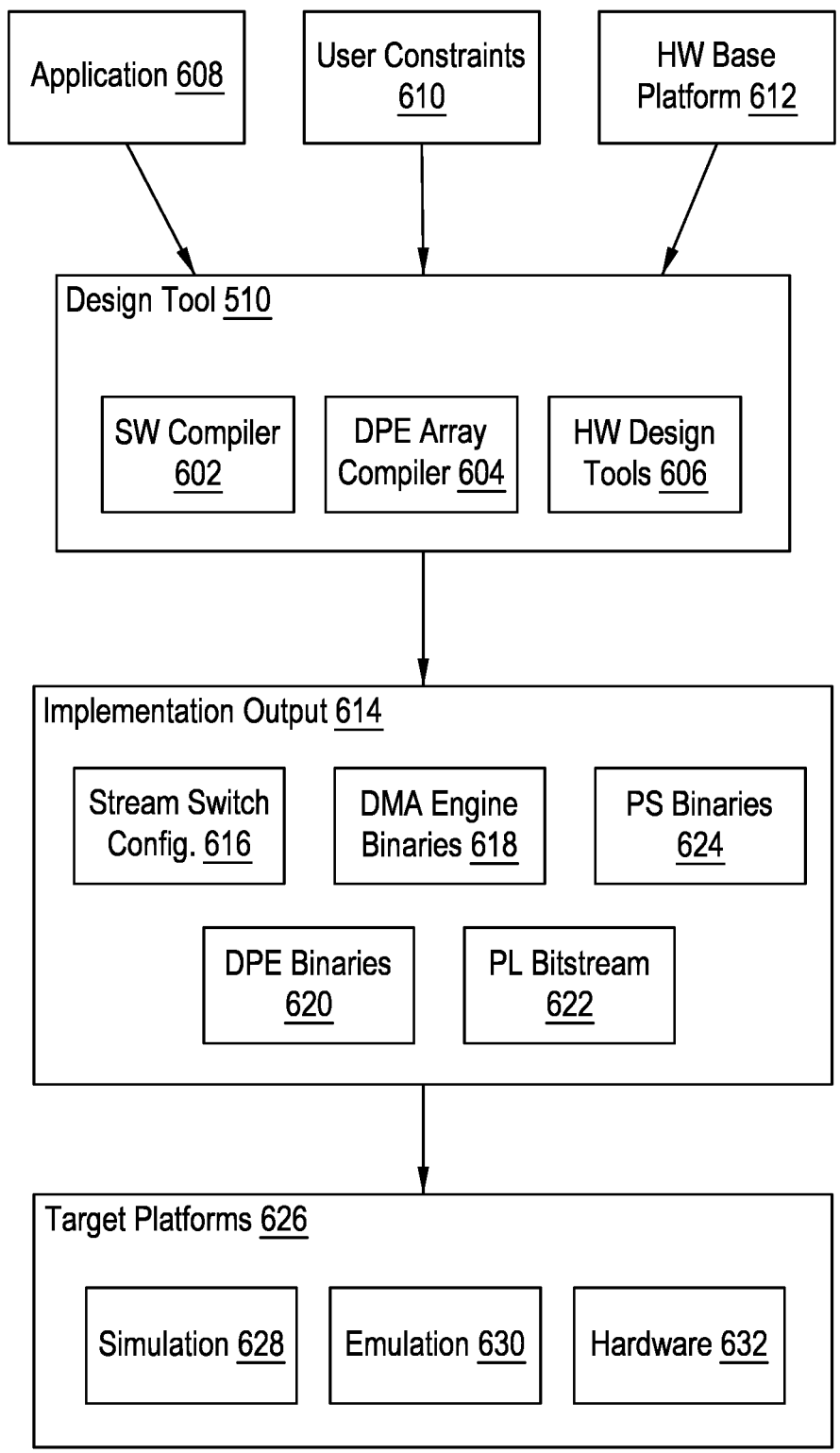
FIG. 6 is a block diagram depicting implementation of an application for a target platform according to an example.

FIG. 6 is a block diagram depicting implementation of an application for a target platform according to an example. The graph compiler 510 includes a software compiler ("SW compiler 602"), a DPE array compiler 604, and hardware design tools ("HW design tools 606"). The graph compiler 510 receives an application 608, user constraints 610, and a hardware base platform ("HW base platform 612"). The user defines the application 608, which is to be implemented for the SoC 100. The application 608 includes portions that map to the PL 122, the PS 130, and the DPE array 105. The SW compiler 602 is configured to compile the portion of the application 608 that maps to the PS 130, which can include source code defined using any programming language (e.g., C, C++, and the like). The HW design tools 606 are configured to implement the portion of the application 608 that maps to the PL 122, which can include circuit descriptions defined using any hardware description language (HDL), register transfer language (RTL), high-level synthesis (HLS) models, concurrent programming language (e.g., SystemC), or the like. The DPE array compiler 604 is configured to compile the portion of the application 608 that targets the DPE array 105, which is defined further below.

Figure 7:
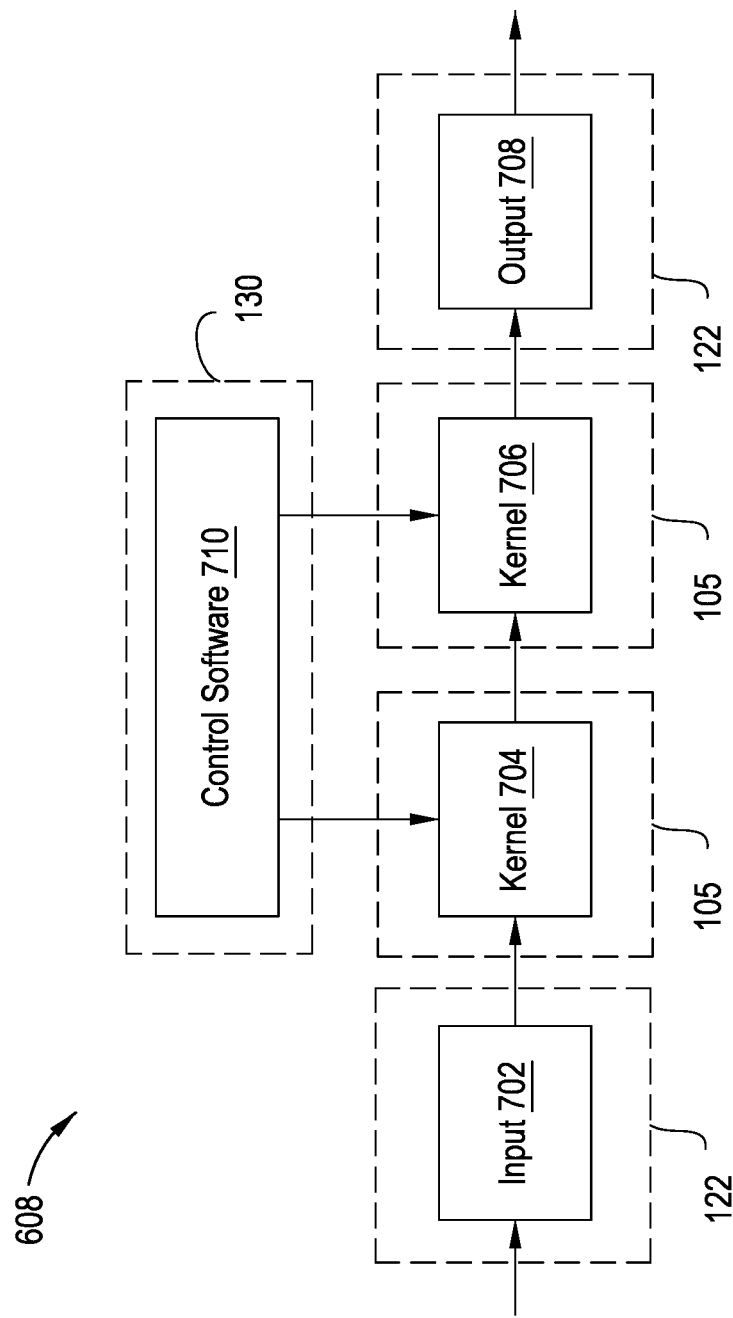
FIG. 7 is a block diagram depicting an application according to an example.

FIG. 7 is a block diagram depicting the application 608 according to an example. A user interacts with the graph compiler 510 to define the application 608 targeting the SOC 100. In the example, the application 608 includes an input circuit 702, a kernel 704, a kernel 706, an output circuit 708, and control software 710. The input circuit 702 is coupled to the kernel 704 and provides data to the kernel 704. The kernel 704 is coupled to the kernel 706 and provides data to the kernel 706. The kernel 706 is coupled to the output circuit 708 and provides data to the output circuit 708. The control software 710 controls the kernel 704 and the kernel 706 and provides data thereto. In general, an application 608 includes one or more circuits, one or more kernels, and control software connected to each other in a specific fashion depending on the design.

In the example, the input circuit 702 comprises digital logic (and optionally analog logic) configured to communicate with external systems/circuits, as well as provide data to the kernel 704 for processing. The input circuit 702 maps to the PL 122. Likewise, the output circuit 708 comprises digital logic (and optionally analog logic) configured to communicate with external systems/circuits, as well as receive data from the kernel 706 that has been processed. The output circuit 708 maps to the PL 122. In an example, the kernels 704 and 706 comprise a programmatic description of data processors. The kernels 704 and 706 map to the DPE array 105. The control software 710 is a programmatic description of a controller for the kernels 704 and 706. In an example, the control software 710 maps to the PS 130.

Returning to FIG. 6, the implementation data 614 includes stream switch configuration code 616, DMA engine configuration code 618, PS binaries 624, DPE binaries 620, and a PL bitstream 622. The SW compiler 602 generates the PS binaries 624 from the source code of the application 608 that targets the PS 130 (e.g., the control software 710). The PS binaries 624 are configured to target a particular microprocessor architecture (e.g., x86, ARM®, and the like). The HW design tools 606 generate the PL bitstream 622 from the portion of the application 608 that targets the PL 122 (e.g., the input circuit 702 and the output circuit 708). The PL bitstream 622 targets a particular SOC device. The DPE array compiler 604 generates the stream switch configuration code 616, the DMA engine configuration code 618, and the DPE binaries 620 based on the portion of the application 608 that targets the DPE array 105 (e.g., the kernels 704 and 706). The stream switch configuration code 616 includes data for programming stream switches 402 in the DPE interconnect 209. The DMA engine configuration code 618 includes data for programming DMA circuitry 220 in memory modules 351 of DPEs 110. The DPE binaries 620 include code for execution by the compute circuitry 203 in cores 202 of DPEs 110.

The implementation output 614 is configured for implementation on target platforms 626. The target platforms 626 include simulation platforms ("simulation 628"), emulation platforms ("emulation 630"), and hardware platforms ("hardware 632"). The hardware 632 includes the SOC 100. The simulation and emulation platforms 628 and 630 simulate/emulate the hardware 632.

Figure 8:
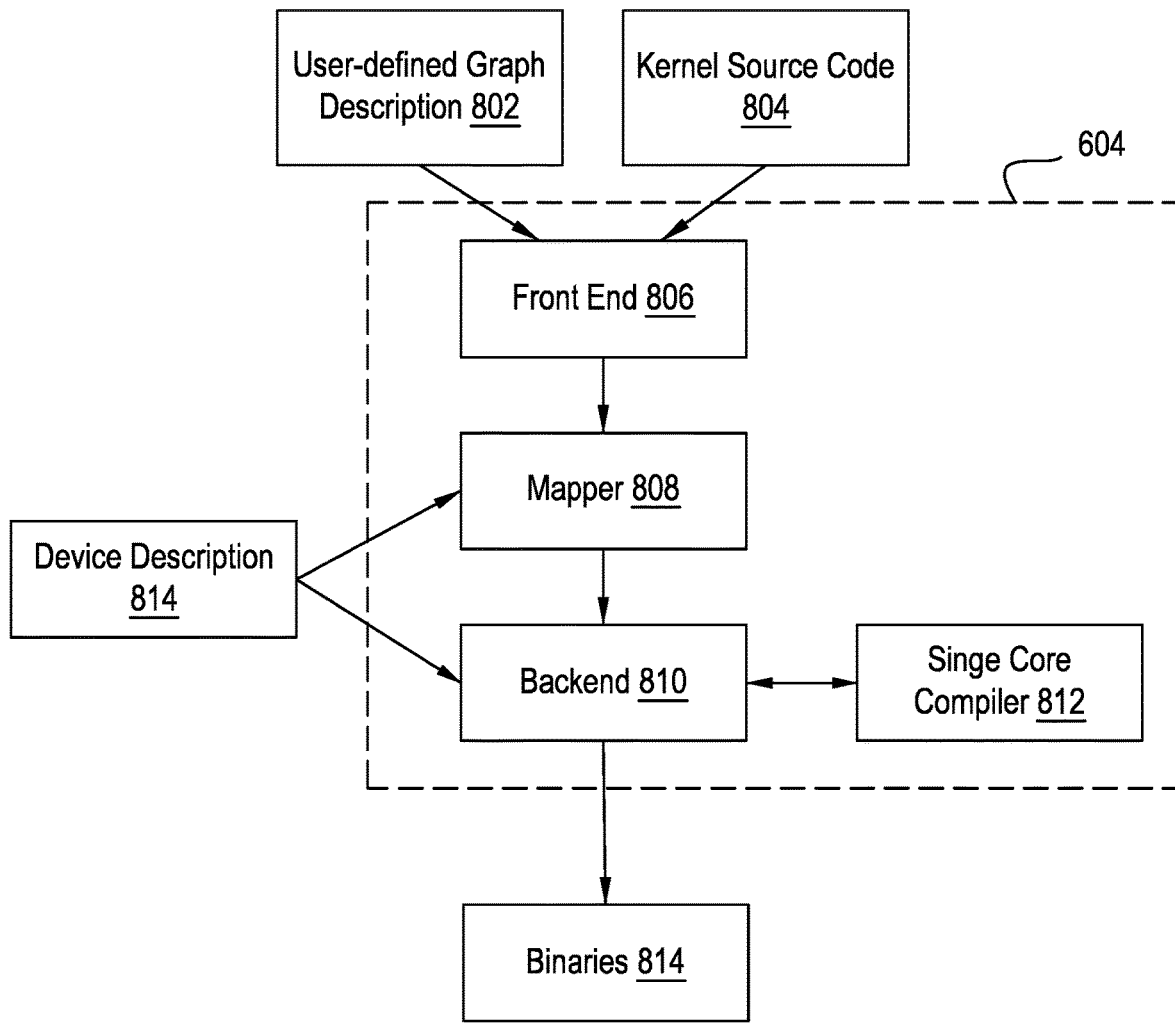
FIG. 8 is a block diagram depicting a data processing engine (DPE) array compiler according to an example.

FIG. 8 is a block diagram depicting the DPE array compiler 604 according to an example. The DPE array compiler 604 includes a front end 806, a mapper 808, a backend 810, and a single core compiler 812. Although the DPE array compiler 604 is described as having discrete components, it is to be understood that the functionality of those components can be implemented using more or less components in different configurations than the example shown in FIG. 8. The portion of the application 608 that targets the DPE array 105 includes a user-defined graph description 802 and kernel source code 804. The user-defined graph description 802 describes the components and their connectivity (e.g., the input circuit 702, the kernels 704 and 706, the output circuit 708, and the control software 710). The kernel source code 804 provides programmatic descriptions of functions to be implemented in DPEs 110 of the DPE array 105.

The user-defined graph description 802 can be specified using various programming languages (e.g., C, C++, etc.) or data structure languages (e.g., XML, JSON, etc.). One example of the user-defined graph description 802 specified in C++ is shown below:

```
using namespace cardano;
class radio:
cardano::graph {
public:
cardano::kernel a,b,c,d,e,f;
radio( ) {
a = kernel::create(polarclip);
b = kernel::create(feedback);
c = kernel::create(equalizer);
d = kernel::create(fir_tap11);
e = kernel::create(fir_tap7);
f = kernel::create(scale);
fabric<fpga>(a);
                                 fabric<fpga>(f);
                                 connect<stream,
     window<64,8> >              ( a.out[0], b.in[0] );
                                 connect<window<32>   >
                                    ( b.out[0], c.in[0] );
                                 connect<window<32, 24>
     >                              ( c.out[0], d.in[0] );
                                 connect<window<32, 16>
     >                              ( d.out[1], e.in[0] );
                                 connect<window<32, 8> >
                                    ( e.out[0], b.in[1] );
                                 connect<window<16>,
     stream >                    ( d.out[0], f.in[0] );
}
}
```

In the example above, the radio class is derived from a class library (cardano) with graph building primitives. Using these primitives, the user-defined graph description 802 defines compute nodes a, b, c, d, e, and f. The compute nodes a and f are circuits mapped to the PL 122. The compute nodes b, c, d, and e are kernels mapped to the DPE array 105. The circuit a is connected to the kernel b using a DMA streaming connection. The kernel b is connected to the kernel c; the kernel c is connected to the kernel d; the kernel d is connected to the kernel e; and the kernel e is connected to the kernel b, where each such connection is through memory blocks in the DPE 105. The kernel d is connected to the circuit F through a DMA streaming connection.

The user-defined graph description 802 can also include a top-level description of the platform. For example:

```
radio mygraph;
simulation::platform<1,1> platform("in.txt", "out.txt");
connect<> net0(platform.src[0], mygraph.in);
connect<> net1(platform.sink[0], mygraph.out);
```

In the example above, the user instantiates the radio class (mygraph) and sets up a simulation target. The user can also specify a control program for execution on the PS 130, such as:

```
int main(void) {
        mygraph.init( );
        mygraph.run( );
        mygraph.end( );
        return 0;
}
```

In the example above, the user initializes mygraph, executes mygraph, and ends mygraph for purposes of simulation in the simulation platform.

The kernel source code 804 provides a source code description for each compute node targeting a DPE 110 (e.g., compute nodes b, c, d, and e in the example above). The kernel source code 804 can be defined using any programming language (e.g., C, C++, etc.). Example C++ source code for defining the compute node c (equalizer) is shown below:

```
void equalizer (input_window_cint16 * inputw, output_window_cint16 * outputw) {
    ...
    v32cint16 sbuff = null_v32cint16( );
    for ( unsigned i=0; i<LSIZE; i++)
        chess_loop_range(2,)
        chess_prepare_for_pipelining
    {
        v4cacc48 acc;
        v8cint16 coe, vdata;
        coe = *coeff++;   // LD coefficients 0:7
        window_readincr(inputw, vdata);
        sbuff = upd_w0(sbuff, vdata); // LDw0 data 0:7    - 0:7|X|X|X
        acc = mul4_nc(   sbuff, 1, 0x3210, 1, coe, 0, 0x0000, 1); // d01:d05 | c0:c1
        acc = mac4_nc(acc, sbuff, 3, 0x3210, 1, coe, 2, 0x0000, 1); // d03:d07 | c2:c3
        window_readincr(inputw, vdata);
        sbuff = upd_w1 (sbuff, vdata);
        acc = mac4_nc(acc, sbuff, 5, 0x3210, 1, coe, 4, 0x0000, 1); // d05:d09 | c4:c5
        acc = mac4_nc(acc, sbuff, 7, 0x3210, 1, coe, 6, 0x0000, 1); // d07:d11 | c6:c7
        coe = *coeff++;   // LD coefficients 8:15
        window_readincr(inputw, vdata);
        sbuff = upd_w2(sbuff, vdata); // LDw2 data 16:23    - 0:7|8:15|16:23|X
        ...
        window_writeincr(outputw,fsrs(acc,shift));
        ...
    }
}
```

In the example, the compute node c (equalizer) is implemented using a C/C++ function with input parameters defining the input of the compute node. The code includes pragmas to assist in scheduling for performance. The code includes intrinsics for performing vectorized computations and application programming interfaces (APIs) for accessing data.

The front end 806 is configured to process the user-defined graph description 802 and generate a directed graph as an internal representation. In the directed graph, nodes represent compute nodes and edges represent connections between compute nodes. The mapper 808 is configured to implement the directed graph for a DPE array 105 in a target device based on a device description 814. The mapper 808 partitions the compute nodes into groups, and maps the partitioned compute nodes to DPEs 110. The backend 810 is configured to route the connections between DPEs 110 and circuits in the PL 122, then invoke the single core compiler 812 to generate DPE binaries, and also generate stream switch and DMA configuration code based on the output of the mapper 808.

FIGS. 9A-9D are block diagrams depicting an example directed graph representation of a portion of the application 608 targeting the DPE array 105 according to an example.

Figure 9A:
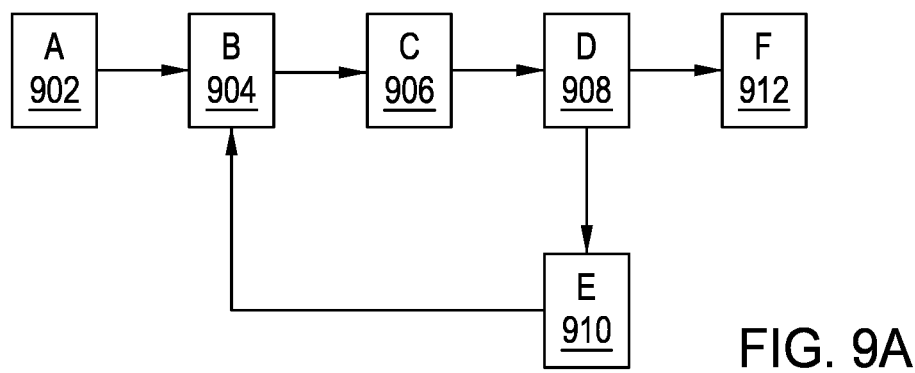
FIGS. 9A-9D are block diagrams depicting an example directed graph representation of a portion of the application targeting the DPE array according to an example.
Figure 9B:
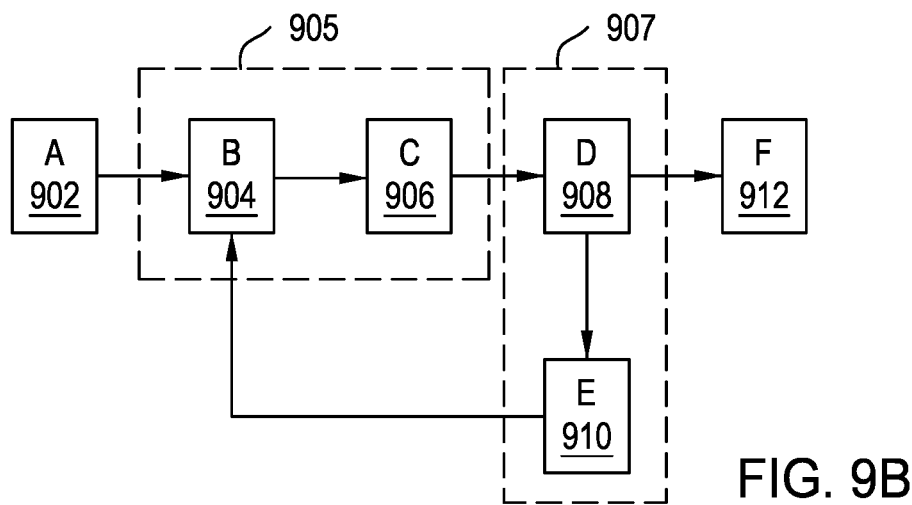
Figure 9C:
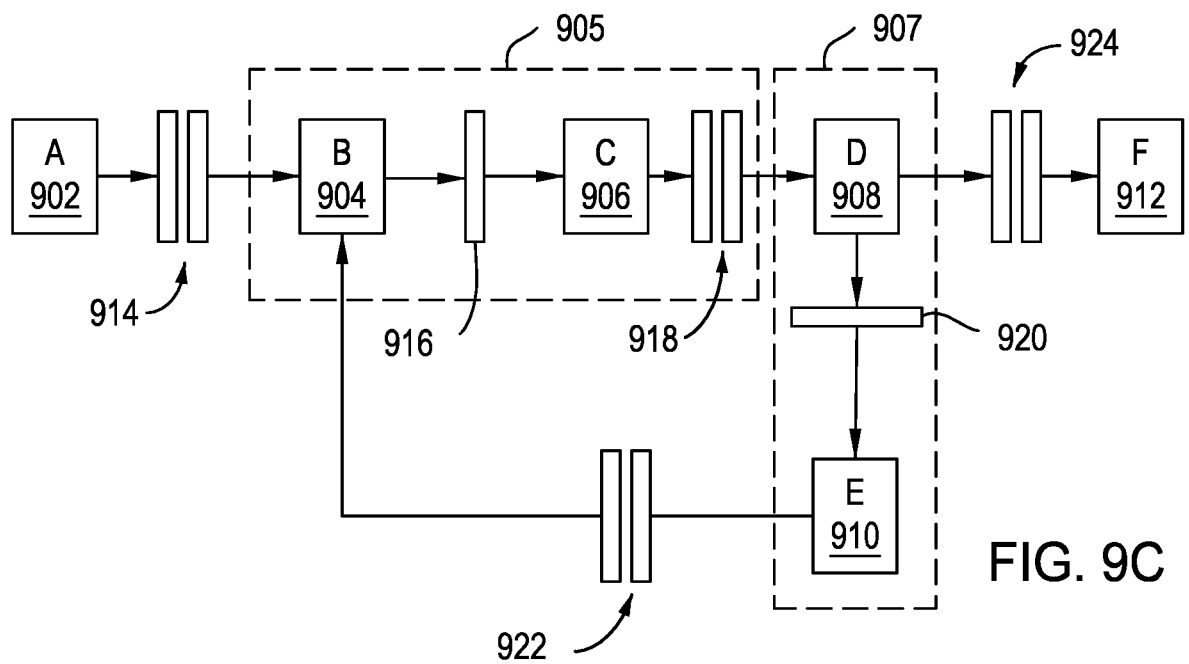
Figure 9D:
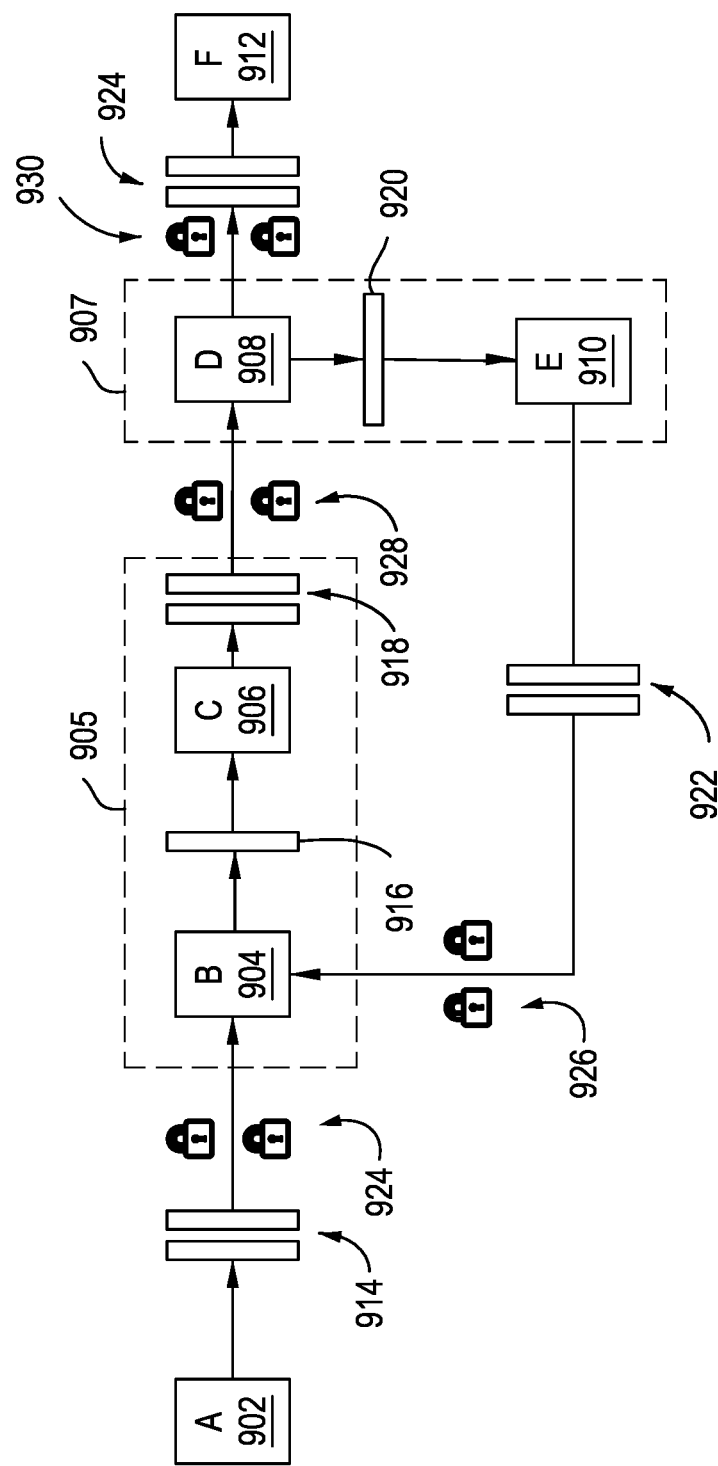
Figure 10:
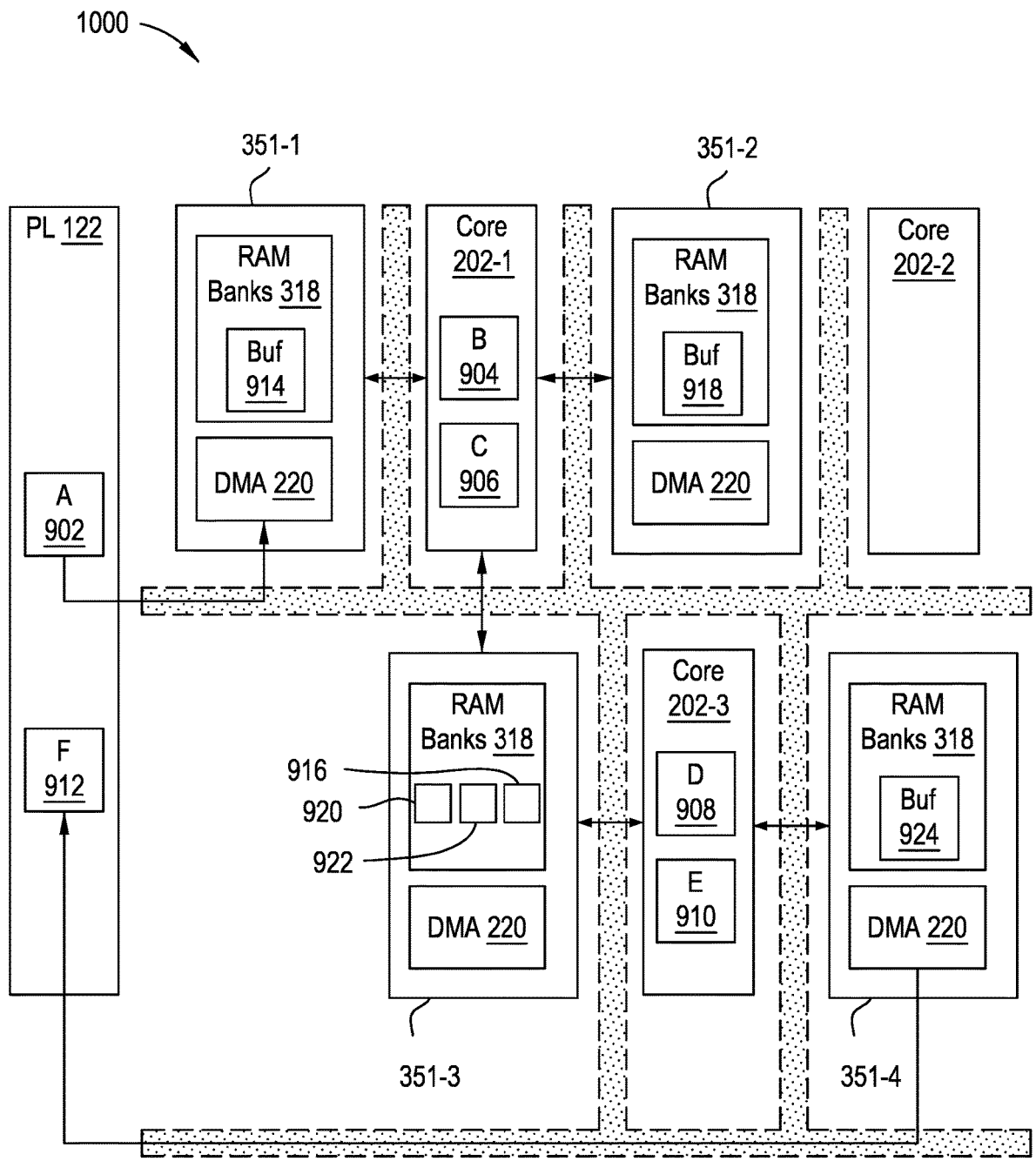
FIG. 10 is a block diagram depicting placement and routing of the directed graph in the DPE array according to an example.

FIG. 10 is a block diagram depicting placement and routing of the directed graph in the DPE array 105. The directed graph in FIGS. 9A-9D represents the example described above for the user-defined graph description 802 having the compute nodes a, b, c, d, e, and f, where compute nodes a and f map to the PL 122 and compute nodes b, c, d, and e map to the DPE array 105. As shown in FIG. 9A, the directed graph includes nodes A 902, B 904, C 906, D 908, E 910, and F 912. The node A is connected to the node B; the node B is connected to the node C; the node C is connected to the node D; the node D is connected to the node F and the node E; and the node E is connected to the node B. FIGS. 9B-9D depict how the mapper 808 processes the directed graph through various operations, as described further below.

Figure 11:
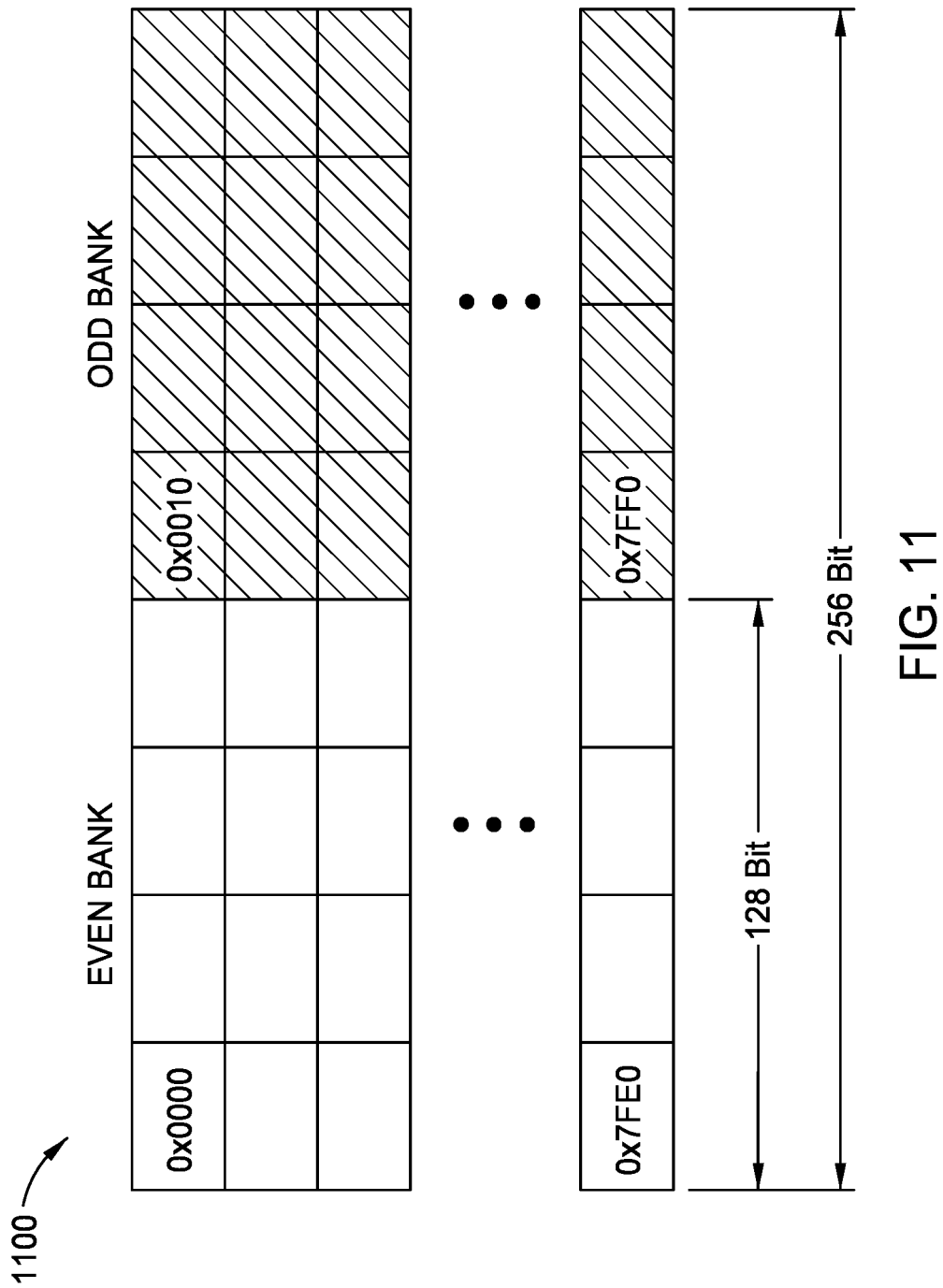
FIG. 11 depicts a Data Memory Diagram.

FIG. 11 illustrates a Data Memory Diagram for a multi-core system. In one example, the multi-core system is an AIE (Adaptive Intelligence Engine). The AIE data memory has two load units and one store unit for accessing data memory. Application data is loaded or stored in application memory. An individual data memory block is 32 KB. The AIE accesses four 32 KB data memory blocks to create a 128 KB unit. These four memory blocks are located on each side of the AIE and are divided and interleaved as odd and even banks (see the following figure). An individual data memory consists of 8 single ported banks (256×128 b each bank) allowing up-to 8 parallel accesses each cycle. From a programmer's perspective, every two banks are interleaved to form one bank, that is, a total of four banks of 8 KB each.

Memory access conflicts or collisions can lead to AIE "core stall", resulting in performance degradation of the application. Memory collisions may occur between two different cores or when one core tries to access a single memory bank using its own memory interface (e.g., trying to load and store in the same cycle to the same memory bank). A bank conflict on any port stalls the entire data path. Communication between the two AIEs can use ping and pong memory buffers on separate memory banks to avoid access conflicts. The synchronization is done through locks.

Current techniques to mitigate the memory accesses in the same cycle from the same bank include annotating the pointers pointing to the same buffer using the same bank resources. In this technique, the memory buffers are manually annotated, resource annotation is passed as the scheduling hint, and the location constraint is passed to the mapper.

Another method used by compiler experts involves an Assembly/Kernel Code/Linker Map and a Mapping Report. The disadvantages of these methods are that a user must glean through mapper generated report to find the buffer placement, the linker generated map file to find the stack and global variables location and assembly file to understand the scheduling.

Figure 12:
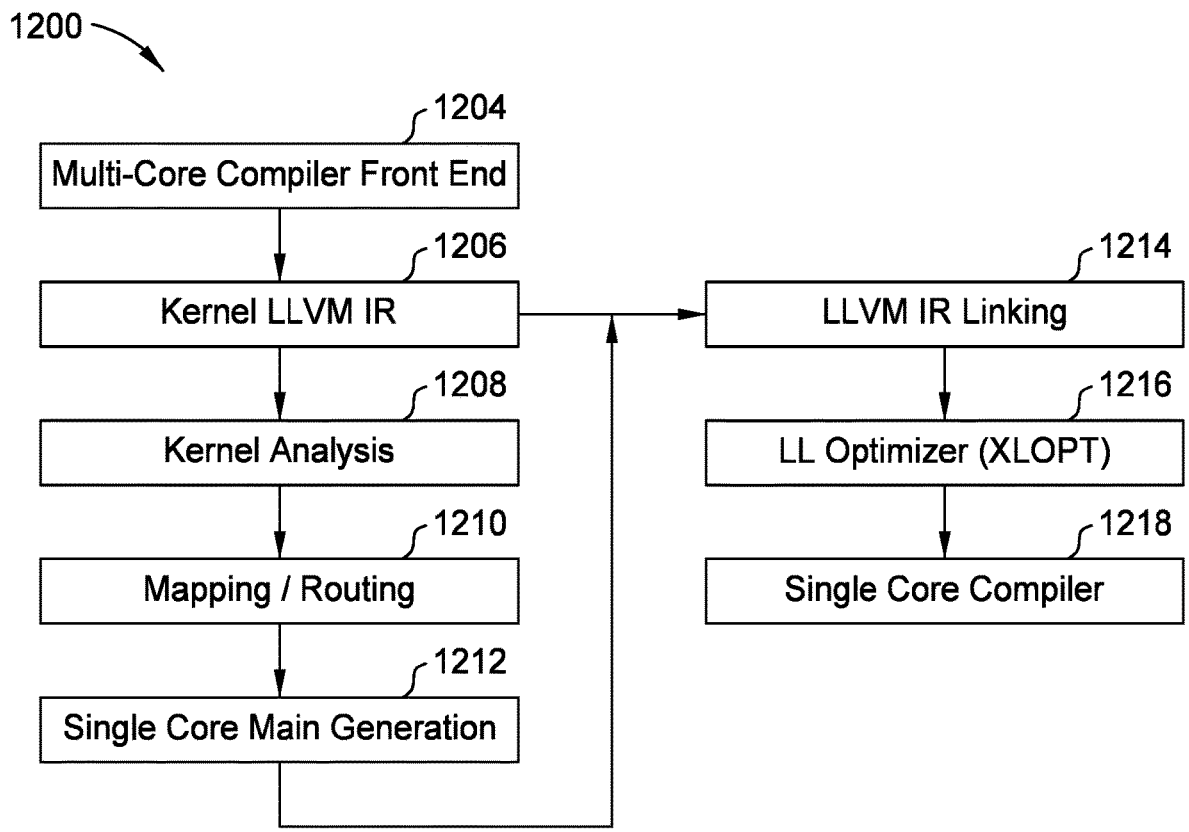
FIG. 12 depicts a present method for Compiler Optimization Flow.

FIG. 12 illustrates an example of a present method for Compiler Optimization Flow.

In block 1204, a multi-core graph compiler front end compiles a control-flow graph for an application or an application kernel. At block 1206, Kernel LLVM Intermediate Representation (LLVM IR) code is produced from the compiled code. The LLVM IR code represents a form of portable assembly language.

The multi-core graph compiler front end (block 1204) contains the calls to the AIE kernels present in the control flow graph. The program code is compiled to produce LLVM IR which is then linked with the kernel LLVM IR to create a single LLVM IR module (block 1206).

In block 1208, a Kernel Analysis is done on LLVM IR using an llvm compiler infrastructure. Integer linear programming (ILP) formulation is a method to solve a set of linear equations. The linear equations capture the problem and constraints. In a graph compiler compilation flow, the mapping/routing (block 1210) determines the buffer placement via ILP formulation.

The single core main generates executable code from the AIE kernel (block 1212), which is then linked at the LLVM IR Linking (block 1214).

At block 1216, the LL Optimizer performs an analysis on LLVM IR produced in block 1214. The intermediate language is LLVM IR (with the .ll file extension). To perform the optimization, the process performs and analysis & transformation on the .LL code, then it applies the optimization, and then translates the .LL code to the optimized LL.

At block 1218, the Compiler takes the optimized .ll and produces the executable ELF format file.

The example described in FIG. 12 of a graph compiler compilation flow leads to a phase ordering issue—the AIE mapper has no knowledge of the fine-grained memory access patterns that might arise post instruction scheduling, and the single-core compiler has no knowledge of buffer placement done by the AIE mapper. Consequently, the compiler code scheduler is free to schedule multiple memory accesses in the same cycle that might potentially access data from the same memory bank which can lead to memory collisions at runtime adversely affecting the throughput.

Another technique to avoid memory conflicts is as follows: An AI mapper takes care of memory buffers placements in the memory banks via ILP formulation are using fixed set of heuristics e.g., making sure to place ping and ping memory buffers in the separate banks, all memory buffers associated with a single kernel are categorized as input, output, and internal and it is preferred that such memory buffers do not go in the same bank. The disadvantage is the mapper has no knowledge of memory accesses pattern in AIE Kernel and without understanding the dependencies and memory access pattern, the placement can lead to memory collisions.

The methods disclosed here are operating system independent. "ELF" refers to a standard binary application program code format. In some examples, depending on the platforms being utilized, the binary code program format may be other formats instead of ELF.

Figure 13:
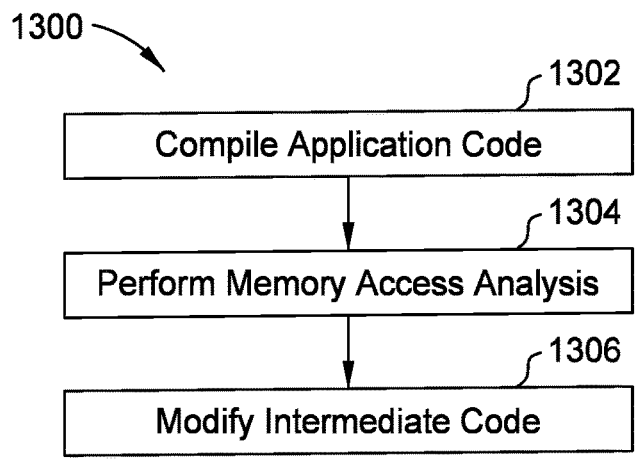
FIG. 13 depicts a novel Proposed Optimization Flow.

In FIG. 13, method 1300 depicts a new and novel Proposed Optimization Flow. In step 1304, an application is compiled to generate intermediate representation code. In step 1306, memory analysis is performed on the generated intermediate representation code. In step 1308, the intermediate representation code is modified to mitigate memory conflicts.

Figure 14:
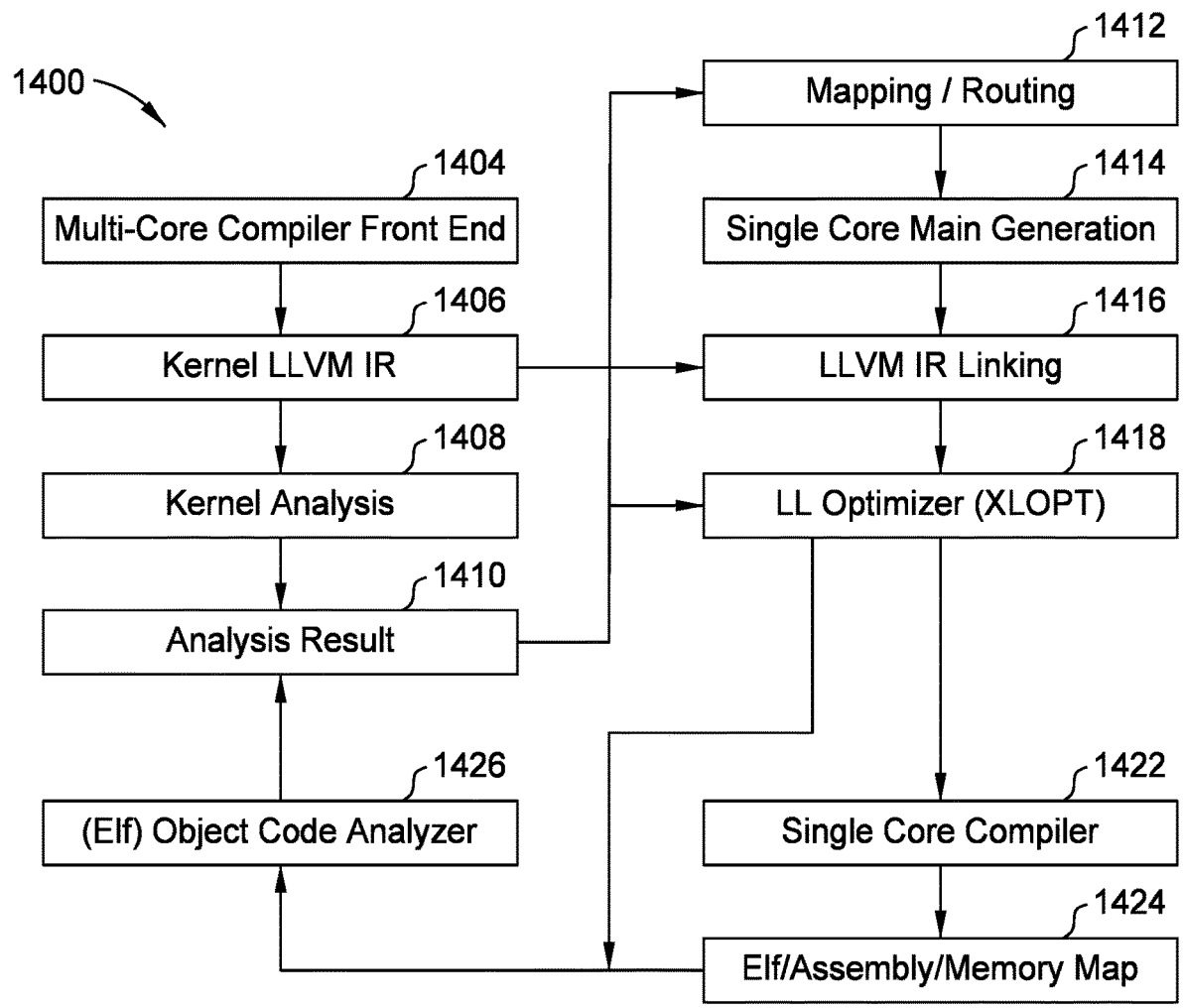
FIG. 14 depicts a novel Proposed Optimization Flow.

In FIG. 14, a new and novel method 1400 disclosed here includes several modules added in the existing graph compiler compilation flow to reduce memory access conflicts. These added modules are the ELF/Assembly/Memory Map (block 1424), the ELF Object Code Analyzer (block 1426), and Analysis Result (block 1410). A feedback loop is created from the ELF Object Code Analyzer to the Analysis Result to the LL Optimizer (block 1418).

In this disclosure, ELF refers to Executable and Linkable Format, a standard binary/object code format.

The method blocks are explained below.

A multi-core compiler compiles application code at block 1404. At block 1406, Kernel LLVM Intermediate Representation (IR) code is produced from code compiled in block 1404.

A. Kernel Analysis: In block 1408, Kernel Analysis is performed. This block involves generating LLVM IR out of the AIE C++ kernel specification. The AIE kernel is written in C/C++. This kernel is a data parallel program that is written using C/C++ and AIE specific Intrinsics. The memory access analysis will be done on the generated LLVM IR as the first operation, to collect information on how the memory buffers are accessed in the kernel.

At block 1410, the analysis result is now utilized to make a decision about properly placing the buffers and annotating the conflicting pointers.

At block 1412, Mapping/Routing is performed. Mapping/Routing involves mapping the AIE kernels and buffers to the core and data memory respectively. Routing involves forming the data flow graph in the hardware by activating the wires and switches.

At block 1414, Single Core Main Generation is performed to create a main wrapper code that contains the calls to AIE kernels. "Main" refers to generated main code that is generated by the multicore compiler for each of the cores where the kernels are placed. The main wrapper code contains main code and a call to the kernels in a core.

At block 1416, LLVM IR Linking is performed. This operation involves bit code linking that links the AIE kernel .ll and generated main .ll.

At block 1418, LL Optimization is performed by entering an optimization loop. This operation involves the transformations of .ll to optimized .ll. The ELF Object Code is analyzed in the post graph compiler optimizer loop.

At block 1422, the Single Core Compiler transforms .ll to object code.

At block 1424, the ELF/Assembly/Memory Map is created.

B. Binaries, Memory Maps and Assembly Analysis:

Block 1426 is the ELF Object Analyzer operation. Bintools are used to do the analysis on the generated ELF binaries, memory map file, and assembly. Bintools are binary analysis tools that understand the ELF code produced by the single core compiler. The Bintools do analysis of ELF code to extract the information needed for analysis, e.g. if the two memory accesses are part of the same instruction in the assembly. The ELF Object Analyzer operation determines information about the pointers and memory.

The ELF Object code analysis has the following parts:

I) Find instructions that are scheduled in parallel, e.g., loaded from memory slot A and memory slot B while scheduled in the same cycle, or loaded and stored in the same cycle. This will also find the symbols which are accessed at the conflicting PCs.

II) The result from operation I) will be correlated with the generated memory map which has the address layout of the symbols to find the conflicting buffers. The analysis of the memory map also determines the conflicting system (stack and global memory) accesses, if any. Currently, a graph compiler places both stack and heap in tandem, in the same bank. This can cause memory conflicts at runtime.

(C. Automatically generating the location buffer constraint:) Based on analyses from parts A and B, placement constraints will be generated and passed as guidance to the AIE mapper. All the accesses which are dependent should go in the same bank. Placement constraints refer to constraining the buffers to a particular location of a core at a particular address by specifying the graph constraint.

(D. Automatically annotating the pointers:) This will be done in the LLVM optimizer, block 1418. All access which belongs to the same bank shall be annotated with same address space; the single core compiler scheduler will then not place two memory accesses coming from the same address space in the same cycle. This LLVM transformation block could be particularly complex since we need to maintain the program semantics. For example, one needs to generalize this optimization to the scenario where a kernel is called from multiple calling contexts, and each calling context gives a different bank annotation to the memory buffers. This pass will use the analyses results from part A and part B.

(E. Results) FIG. 15 illustrates some test results after performing method 1400 on some of the applications mentioned in the table.

The optimization methods disclosed here result in a significant reduction in the number of dynamic cycles occurring during the benchmark tests. Dynamic cycles refers to the number of cycles used when running the design on the system hardware or in the cycle accurate simulator.

There are a few alternate methods to perform the method of 1400, depending on what is used as a single core compiler, depending on how much control there is from within the graph compiler of single core compiler passes. Using a third party compiler (i.e. a "chess" compiler) as a single core compiler, the scheduling information is available only in the form of compiler generated data and hence the described flow is using post-graph compiler optimization passes and gleaned information is passed as feedback to graph compiler.

The novel features are: Kernel analysis aided AIE mapping, and subsequently passing the mapped memory buffers information to the compiler along with using analysis results from binary analysis and LLVM IR analysis results, for automatically annotating the pointers to avoid memory collisions.

The compilation flow method can be applied beyond the use of the AIE compiler by generalizing the memory accesses analysis and feedback-based information in grouping the pointers in the kernel with similar properties in the same address space.

FIG. 16 depicts memory pointers pointing to the same buffer, as a result of compiling application code for a DPE array. In image 1604, Intermediate Representation (IR) code is displayed, where memory pointers are pointing to the same buffer and are conflicting with each other. In image 1608, a segment of application code is displayed, where memory pointers are pointing to the same buffer and are conflicting with each other, thus producing "memory stalls".

Figure 17:
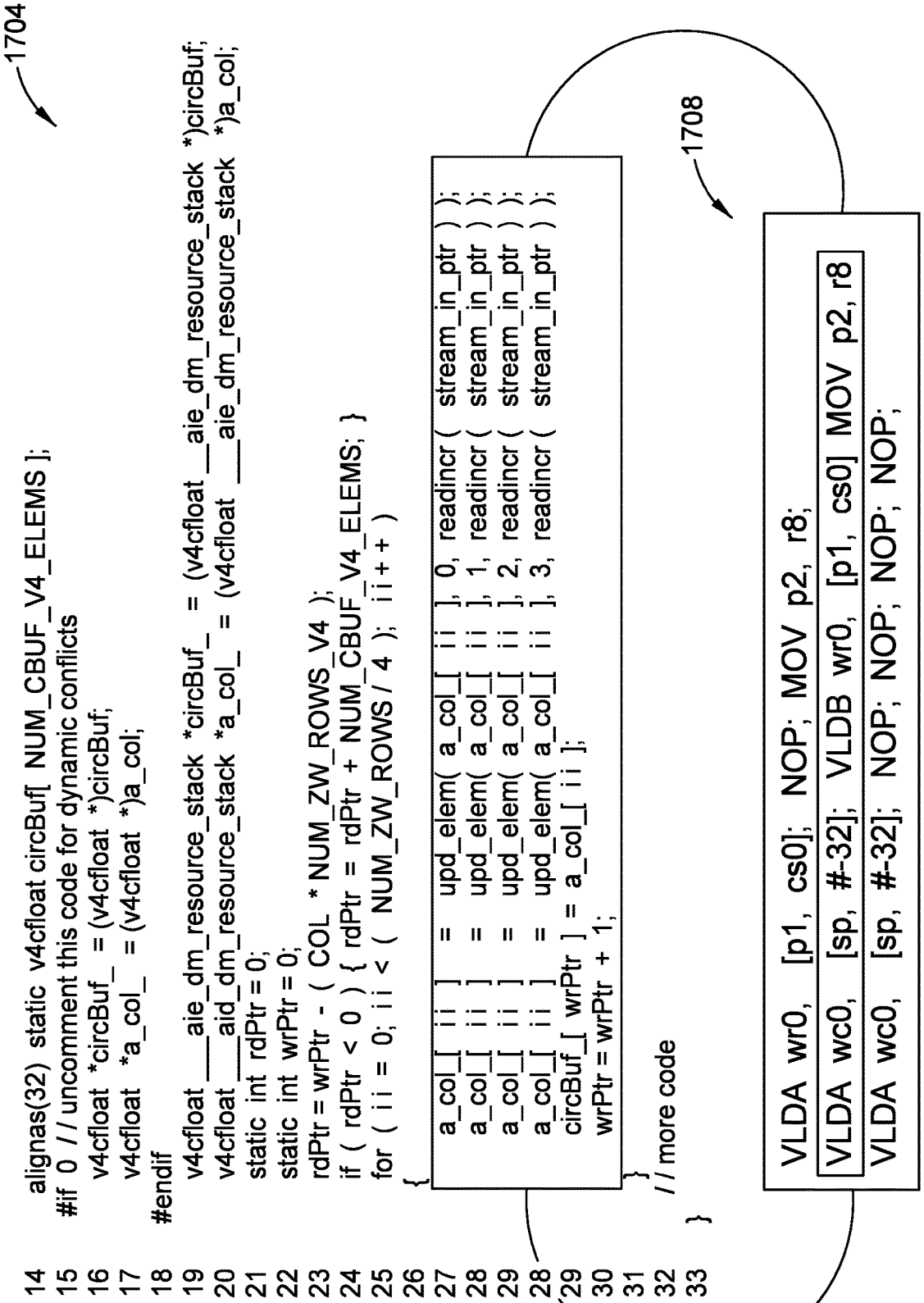
FIG. 17 depicts Global and stack memory conflicts.

FIG. 17 depicts global and stack memory conflicts, as a result of compiling application code for a DPE array. In image 1704, a segment of application code is depicted. In image 1708, IR code is depicted that produces global and stack memory conflicts, thus producing "memory stalls".

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

The methods disclosed herein comprise one or more operations or actions for achieving the methods. The method operations and/or actions may be interchanged with one another. In other words, unless a specific order of operations or actions is specified, the order and/or use of specific operations and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "operation for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5 and/or FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to specific examples, other and further examples may be devised without departing from the basic scope thereof, and the scope thereof is determined by the claims that follow.

What is claimed is:

1. A method for mapping an application to a data processing engine (DPE) array, comprising:
    compiling application code to generate intermediate representation code;
    performing memory access analysis on the intermediate representation code; and
    modifying the intermediate representation code, based on the memory access analysis, to map the application to the DPE array, a memory map analysis including:
        locating conflicting pointers pointing to a same buffer; and
        automatically annotating the conflicting pointers with a same address space.

2. The method of claim 1, further comprising:
    modifying the intermediate representation code to mitigate memory conflicts in a compiled application.

3. The method of claim 2, further comprising:
    entering an optimization loop to produce optimized intermediate representation code.

4. The method of claim 3, further comprising:
linking the intermediate representation code to produce executable code.

5. The method of claim 1, wherein the generated intermediate representation code comprises LLVM intermediate representation (IR) code.

6. The method of claim 1, further comprising:
performing an analysis on the intermediate representation code; and
locating instructions that are scheduled in parallel.

7. The method of claim 6, further comprising:
generating placement constraints; and
passing the placement constraints to a memory mapper.

8. The method of claim 7, wherein the memory map analysis further includes partitioning nodes of a directed graph representing at least a portion of the application into groups of pointers with similar properties.

9. The method of claim 8, further comprising:
passing memory optimized code to a single core compiler; and
compiling a node in the single core compiler.

10. A computer system, comprising:
memory configured to store intermediate representation code; and
a processor configured to implement a compiler by:
compiling application code to generate intermediate representation code;
performing memory access analysis on the intermediate representation code; and
modifying the intermediate representation code, based on the memory access analysis, to map an application to a data processing engine (DPE) array, a memory map analysis including:
locating conflicting pointers pointing to a same buffer; and
automatically annotating the conflicting pointers with a same address space.

11. The computer system of claim 10, further comprising the steps of:
modifying the intermediate representation code to mitigate memory conflicts in a compiled application.

12. The computer system of claim 11 further comprising:
entering an optimization loop to produce memory optimized intermediate representation code.

13. The computer system of claim 12, further comprising:
linking the intermediate representation code to produce executable code.

14. The computer system of claim 10, wherein the generated intermediate representation code comprises LLVM intermediate representation (IR).

15. The computer system of claim 10, further comprising:
analyzing application memory;
analyzing the intermediate representation code; and
locating instructions that are scheduled in parallel.

16. The computer system of claim 15, further comprising:
generating placement constraints; and
passing the placement constraints to a memory mapper.

17. The computer system of claim 16,
wherein the memory map analysis further includes partitioning nodes of a directed graph representing at least a portion of the application into groups of pointers with similar properties.

18. The computer system of claim 10, further comprising:
passing memory optimized code to a single core compiler; and
compiling single nodes in the single core compiler.

19. The computer system of claim 10, further comprising:
generating memory maps of the application code.

20. A computer system, comprising:
memory configured to store application code; and
a processor configured to implement a compiler by:
compiling the application code to generate intermediate representation code;
performing memory access analysis on the intermediate representation code;
performing an analysis on memory maps, the memory map analysis including locating conflicting pointers pointing to a same buffer and automatically annotating the conflicting pointers with a same address space;
performing an analysis on the intermediate representation code;
locating instructions that are scheduled in parallel;
generating placement constraints;
passing the placement constraints to a memory mapper;
optimizing the intermediate representation code to produce memory optimized code;
modifying the intermediate representation code to mitigate memory conflicts in a compiled application.

* * * * *